United States Patent [19]

Johnson

[11] Patent Number: 5,466,482
[45] Date of Patent: Nov. 14, 1995

[54] PHOSPHORIC ACID MONOESTERS USEFUL FOR SURFACE TREATMENT OF PIGMENTS FOR WATERBORNE COATINGS

[75] Inventor: Mark W. Johnson, Goose Creek, S.C.

[73] Assignee: Bayer Corporation, Pittsburg, Pa.

[21] Appl. No.: 356,940

[22] Filed: Dec. 15, 1994

[51] Int. Cl.⁶ .......................................................... B05D 7/00
[52] U.S. Cl. ........................... 427/212; 106/493; 106/504
[58] Field of Search ............................ 406/493; 106/504; 427/212

[56] References Cited

U.S. PATENT DOCUMENTS

| | | | |
|---|---|---|---|
| 4,323,396 | 4/1982 | Ehi et al. | 106/23 |
| 4,872,916 | 10/1989 | Latosky | 106/503 |
| 4,885,191 | 12/1989 | Podzen et al. | 427/212 |
| 4,891,401 | 1/1990 | Huybrechts et al. | 524/807 |
| 4,927,463 | 5/1990 | Kloetzer et al. | 106/109 |
| 5,073,585 | 12/1991 | Neubert | 524/139 |

FOREIGN PATENT DOCUMENTS

| | | |
|---|---|---|
| 499672 | 2/1979 | Australia. |
| 2414455 | 10/1975 | Germany. |
| 2090876 | 7/1982 | United Kingdom. |

OTHER PUBLICATIONS

Chem. Abstract 105(14):116702w(PL 127761,Jun. 28, 1985) Aqueous Pigment Paste, Matysiak et al.

Primary Examiner—Michael Lusignan
Attorney, Agent, or Firm—Joseph C. Gil; Richard E. L. Henderson

[57] ABSTRACT

This invention relates to a process for surface treating organic pigments by applying to the surface of an organic pigment (a) about 0.5 to about 15 percent by weight, relative to the pigment, of a phosphoric acid monoester having the formula $$R-O-\overset{\overset{\displaystyle O}{\|}}{P}(OM)_2$$

wherein R is an optionally substituted saturated or unsaturated $C_5$–$C_{40}$ aliphatic group, and M is hydrogen, metal, or ammonium;

optionally in admixture with (b) 0 to about 10 percent by weight, relative to the phosphoric acid monoester, of a process additive.

9 Claims, No Drawings

PHOSPHORIC ACID MONOESTERS USEFUL FOR SURFACE TREATMENT OF PIGMENTS FOR WATERBORNE COATINGS

BACKGROUND OF THE INVENTION

This invention relates to the surface treatment of organic pigments used in waterborne coatings with certain phosphoric acid monoesters.

Traditional methods for the surface treatment of organic pigments were designed for solvent borne coatings. The surfaces of both untreated and conventionally treated organic pigments tend to be hydrophobic. However, because of the trend away from solvent-based coatings toward waterborne coatings, surface treatments that allow the organic pigment to be more readily dispersed and stabilized in waterborne systems would be desirable. That is, a more hydrophilic pigment surface is desired.

Pigment dispersions containing phosphoric acid esters (also referred to as phosphate esters) have been described. However, surface treatment of organic pigments with such phosphoric acid esters has generally not been described. For example, U.S. Pat. No. 4,872,916 discloses aqueous pigment dispersions in which the dispersing agent is an ethoxylated alkylphenol phosphate diester. However, in addition to disclosing phosphate diesters rather than monoesters, this patent is directed to preparation of aqueous dispersions containing relatively large quantities of phosphate esters as dispersing aids rather than surface treatment of pigments. U.S. Pat. No. 4,891,401 discloses polymeric pigment dispersants based on polymers having phosphorus-containing acrylate units. However, this patent does not disclose dispersing agents based on phosphoric acid monoesters such as used in the present invention and is directed to aqueous dispersions rather than surface-treatment. U.S. Pat. No. 4,927,463 discloses aqueous gypsum dispersions containing polyoxyalkylene or (alkylphenoxy)alkyl phosphate monoesters and diesters for use in coating and filling paper and cardboard but does not disclose organic pigments or surface treatment of pigments. U.S. Pat. No. 5,073,585 discloses aqueous coatings containing calcium or magnesium pigments and/or fillers, aqueous secondary dispersions of a (meth)acrylate copolymer, and alkyl- and phenyl-substituted oxyalkyl monoesters of phosphoric acid but does not disclose organic pigments or surface treatment of pigments. British Patent 2,090,876 discloses aqueous dispersions of water-insoluble pigments, dyes, and optical brighteners and water-soluble crypto-ionic dispersing agents such as polyoxyalkylene aryl phosphate esters but also does not mention surface treatment. German Offenlegungsschrift 2,414,455 discloses pigment dispersions containing certain sulfonates and oxyethylated fatty amines and optional long-chain dialkyl phosphates that are structurally different from the phosphoric acid monoesters of the present invention. Moreover, the German application does not disclose surface treatment. Polish Patent 127,761 discloses pigment pastes containing inter alia (i) a mixture of ethoxylated alkylphenols and polyethylene glycol ether and (ii) a phosphate glaze as a water-softening agent. This patent does not appear to disclose phosphate monoesters such as used in the present invention.

Although certain phosphoric acid esters have been described as useful for surface treatment of pigments, phosphate monoesters such as those used in the present invention have not been described. For example, U.S. Pat. No. 4,323,396 discloses organic pigments treated with polysaccharides containing ionic groups, including an anionic phosphate ester based on potato starch, but does not disclose phosphate monoesters such as used for the present invention. Australian Patent 499,672 discloses a comminution process in which pigments are ground in water containing a fugitive auxiliary, such as a phosphate ester of long chain alcohols or alcohol alkoxylates, after which the fugitive auxiliary must be hydrolytically deactivated by steam distillation or high-temperature drying to obtain pigments having improved tinctorial properties.

It has now been found that the adsorption of certain phosphoric acid monoesters according to the present invention onto pigment surfaces increases the hydrophilicity of the pigment. Consequently, surface modification with such phosphoric acid monoesters provides organic pigments having improved dispersibility in waterborne systems, improved color development, and lower pigment paste viscosity.

SUMMARY OF THE INVENTION

This invention relates to a process for surface treating organic pigments comprising applying to the surface of an organic pigment (a) about 0.5 to about 15 percent by weight (preferably 3 to 10 percent by weight, more preferably 3 to 8 percent by weight), relative to the pigment, of a phosphoric acid monoester having the formula

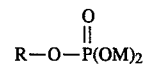

wherein
a is
(i) a saturated $C_5$–$C_{40}$ aliphatic group or a saturated $C_5$–$C_{40}$ aliphatic group in which one or more aliphatic carbon atoms is substituted with halogen, $C_1$–$C_6$ alkyl, $C_1$–$C_6$ alkoxy, a $C_6$–$C_{10}$ aromatic hydrocarbon group (preferably phenyl or naphthyl) or a $C_6$–$C_{10}$ aromatic hydrocarbon group substituted with one or more $C_1$–$C_{12}$ alkyl groups, or —COOR$^a$ (wherein R$^a$ is hydrogen, metal, ammonium, $C_1$–$C_6$ alkyl, or $C_6$–$C_{10}$ aryl), optionally wherein one or more non-adjacent aliphatic backbone carbon atoms are replaced with O, S, or NR$^b$ (wherein R$^b$ is $C_1$–$C_6$ alkyl or $C_6$–$C_{10}$ aryl) (preferably with O such that R is a polyalkylene oxide having 2 to 12 alkylene oxide units, more preferably terminally substituted with a substituted aromatic hydrocarbon group), or (ii) an unsaturated $C_5$–$C_{40}$ aliphatic group or an unsaturated $C_5$–$C_{40}$ aliphatic group in which one or more aliphatic carbon atoms is substituted with halogen, $C_1$–$C_6$ alkyl, $C_1$–$C_6$ alkoxy, a $C_6$–$C_{10}$ aromatic hydrocarbon group (preferably phenyl or naphthyl) or a $C_6$–$C_{10}$ aromatic hydrocarbon group substituted with one or more $C_1$–$C_6$ alkyl groups, or —COOR$^a$ (wherein R$^a$ is hydrogen, metal, ammonium, $C_1$–$C_6$ alkyl, or $C_6$–$C_{10}$ aryl), optionally wherein one or more non-adjacent aliphatic backbone carbon atoms are replaced with O, S, or NR$^b$ (wherein R$^b$ is $C_1$–$C_6$ alkyl or $C_6$–$C_{10}$ aryl), and M is hydrogen, metal, or ammonium;

in admixture with (b) 0 to about 10 percent by weight (preferably 1 to 5 percent by weight), relative to the phosphoric acid monoester, of a process additive (preferably a defoamer and/or a surfactant). The invention further relates to surface-treated organic pigments obtained by this process.

DETAILED DESCRIPTION OF THE INVENTION

Suitable organic pigments for use in the surface treatment process of the present invention include phthalocyanine, perylene, and quinacridone pigments, as well as other organic pigments known in the art. Metal phthalocyanine pigments are generally preferred. Although the copper phthalocyanines are preferred, other metal-containing phthalocyanine pigments, such as those based on zinc, cobalt, iron, nickel, and other such metals, may also be used. Furthermore, the preferred phthalocyanine pigments of the present invention can be partially substituted (for example, with halogens such as chlorine, alkyl, sulfonate, or other substituents typical of phthalocyanine pigments) or unsubstituted.

The process of this invention can also be used for surface treatment of perylenes, including unsubstituted perylene and known substituted perylenes derivatives (such as those containing alkyl, halogen, or other such substituents), and quinacridones, including unsubstituted quinacridone, substituted quinacridone derivatives (such as those containing alkyl, halogen, or other such substituents). Mixtures, including solid solutions, of such pigments can also be surface treated according to the invention.

Suitable phosphate monoesters for the surface treatment of organic pigments according to the present invention include phosphoric acid monoesters having the formula

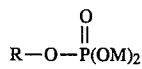

$$R-O-P(OM)_2$$
with =O in which R and M are defined as above.

Suitable unsaturated aliphatic monoesters of phosphoric acid include compounds in which one or more of the aliphatic backbone carbon atoms can be substituted with a halogen (such as fluorine or chlorine), a $C_1-C_6$ alkyl group, a $C_1-C_6$ alkoxy group, a $C_6-C_{10}$ aromatic hydrocarbon group (preferably phenyl or naphthyl) that can optionally be substituted with one or more (preferably 1 to 3) $C_1-C_6$ alkyl groups, or a —$COOR^a$ group in which $R^a$ is hydrogen (i.e., the free acid), a metal or ammonium cation (i.e., salt forms), or $C_1-C_6$ alkyl or $C_6-C_{10}$ aryl (i.e., ester forms). It is also possible, or even preferred, to replace one or more non-adjacent aliphatic backbone carbon atoms with an oxygen or sulfur atom or a $NR^b$ group (in which $R^b$ is $C_1-C_6$ alkyl or $C_6-C_{10}$ aryl). It is particularly preferred to include saturated aliphatic groups in which aliphatic backbone carbon atoms are replaced with an oxygen in such a way that the group R is a polyalkylene oxide having 2 to 12 alkylene oxide units, particularly when the polymer chain is terminally substituted with a substituted aromatic hydrocarbon group (such as phenyl or naphthyl bearing one or more, preferably one or two, $C_1-C_{12}$ alkyl substituents).

Suitable unsaturated aliphatic monoesters of phosphoric acid include compounds in which the unsaturated aliphatic group, preferably an alkenyl group, is unsubstituted or substituted, for example, with the same substituents described above for the alkyl groups, except that any backbone carbon atoms having a double bond are not replaced with O, S, or $NR^b$.

Each type of phosphoric acid monoester can be used as the free acid (that is, where M is hydrogen) or as various metal or ammonium salts. Suitable metal salts include those in which M is an alkali or alkaline earth metal, such as lithium, sodium, potassium, calcium, or barium. Preferred metal salts are those containing the alkali metals sodium and potassium. Suitable ammonium salts include those based on unsubstituted or substituted ammonium ions of the general formula $NR'R''R'''R''''^+$ (wherein R', R'', R''', and R'''' are independently hydrogen, alkyl, or aralkyl). Preferred ammonium salts are those containing unsubstituted $NH_4^+$ or tetra($C_1-C_6$ alkyl)ammonium ions such as tetramethylammonium or tetraethylammonium ions.

Preferred phosphoric acid monoesters include those in which R is a polyalkylene oxide having 2 to 12 alkylene oxide units terminally substituted with a substituted phenyl group having one or more alkyl groups (e.g., phosphate esters of nonylphenol or dinonylphenol ethoxylates available from Rhone-Poulenc and Ethox Chemical) and those in which R is an aliphatic group containing lateral or terminal —$COOR^a$ groups (such as the complex carboxy phosphate ester available as LUBRIZOL® 2063 from Lubrizol Corp.).

The process of the present invention can be carried out applying the phosphoric acid monoester to the surface of a organic pigment by methods known in the art. For example, an organic pigment can be stirred with the phosphoric acid monoester in an aqueous medium, preferably at an initial pH of about 9 to about 10 (which drops to about pH 3-4 during the process). Although temperatures are generally not critical (except to the extent that high temperatures can cause undesired chemical and physical changes), surface treatment is generally carried out at temperatures of about 50° C. to about 140° C. (preferably 70° C. to 120° C.). The quantity of phosphate monoester is selected to provide a pigment having about 0.5 to about 15 percent by weight (preferably 3 to 10 percent by weight, more preferably 3 to 8 percent by weight) of the phosphate monoester on the pigment surface. The treated pigment can then be collected by methods known in the art, such as filtration or centrifugation, preferably followed by a washing step to removed excess phosphate ester.

The phosphoric acid monoesters of the invention can be used in combination with 0 to about 10 percent by weight (preferably 1 to 5 percent by weight), relative to the phosphoric acid monoester, of known process additives. Such additives, however, are not necessary. Examples of suitable process additives include known defoamers, surfactants (such as known non-ionic surfactants and sulfonate-containing surfactants), and wetting agents.

Because of their light stability and migration properties, the surface-treated pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the surface-treated pigments of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions and processes of the following procedures can be used. Unless otherwise noted, all temperatures are degrees Celsius and all percentages are percentages by weight.

EXAMPLES

Surface-treated pigments prepared according to the Examples, as well as corresponding untreated control pigments, were analyzed for zeta potential (or surface charge) as a function of pH using a System 7000 Acoustophoretic Titrator from Pen Kem Inc. After the densities of the pigment samples were determined using a Micrometrics Accupyc 1330 instrument, a 2% by volume dispersion of each pigment was prepared by first gently mixing the pigment with 300 ml of deionized water and then sonicating with a Cole-Parmer 4710 ultrasonic homogenizer for 10 minutes. The resultant dispersions were poured into the sample cell of the acoustophoretic titrator and placed under a vacuum to remove entrained air bubbles. The pH was adjusted to and stabilized at pH 10.0, after which zeta potential was automatically measured as a function of pH down to pH 1 or 2.

A large zeta potential relative to the control indicates greater surface treatment of the pigment. A constant or nearly constant change in zeta potential over a broad pH range indicates that the pigment should be adaptable to and stable in different paint systems. A pigment with a relatively high pH isoelectric point (i.e., the pH at which the sample has no apparent surface charge) would be expected to flocculate more readily than a pigment having a lower or no pH isoelectric point.

Examples 1–5

Surface treatment of a phthalocyanine pigment

Crude chlorinated copper phthalocyanine presscake for use in Examples 1–5 was prepared by the direct chlorination method described in Example 1 of U.S. Pat. No. 4,077,974 or Examples 1–5 of U.S. Pat. No. 4,948,884.

A control chlorinated copper phthalocyanine pigment was prepared using the same method as Example 2 (below) except for using a wood rosin instead of the phosphate ester.

Example 1

A 317.2 g portion of a crude chlorinated copper phthalocyanine presscake having a chlorine content of about 13–14% by weight (dry content of 55.2 g) was mixed in an autoclave with 234.8 ml of water until a smooth slurry was obtained. After the pH was adjusted to 9.0–9.5 with 50% aqueous sodium hydroxide, 4.8 g of the phosphate ester of a dinonylphenol ethoxylate available as ETHOX® 2195 from Ethox Chemical (ca. 9% of the dry content of the pigment) and 0.6 g of an acetylenic diol-based defoaming agent available as SURFYNOL® 104E from Air Products Inc. were added. The mixture was stirred for 15 minutes, after which the pH was readjusted to 9.0–9.5 with sodium hydroxide, the volume was adjusted to approximately 700 ml with water, and the mixture was heated in the sealed autoclave at 115°–120° C. for three hours. The mixture was cooled to 60° C., adjusted to pH 3.0–4.0 with glacial acetic acid, and stirred for one hour at 55°–60° C. The mixture was then filtered and the solid that was collected was washed with water until conductivity free and dried in an oven at 60° C. Zeta potential data for the resultant surface-treated pigment are shown in Table 1.

Example 2

The procedure of Example 1 was repeated except for using 2.8 g of the phosphate ester (5% of the dry content of the pigment) and hydrochloric acid for pH adjustment after the autoclaving step. Zeta potential data for the resultant surface-treated pigment are shown in Table 1.

Example 3

The procedure of Example 1 was repeated except for using 447.8 g of the presscake (dry content of 60 g), 3.0 g of the phosphate ester (5% of the dry content of the pigment), and 1.8 g of a sodium succinate sulfonate-containing surfactant available as AEROSOL® TR-70 from Cytec (3% of the dry content of pigment) as the defoaming agent. Zeta potential data for the resultant surface-treated pigment are shown in Table 1.

Example 4

The procedure of Example 1 was repeated except for using 735.3 g of the presscake (dry content of 121.5 g) and 13.5 g of the phosphate ester of a nonylphenol ethoxylate available as RHODAFAC® PE-510 from Rhone-Poulenc (11% of the dry content of the pigment).

Example 5

The procedure of Example 1 was repeated except for using 372.3 g of the presscake (dry content of 51 g) and 15 g of a complex carboxy phosphate ester available as LUBRIZOL® 2063 (29% of the dry content of the pigment) from Lubrizol Corp. as the phosphate ester.

TABLE 1

Zeta potential data for surface-treated phthalocyanines

| Example | Initial zeta potential (pH 10) | Zeta potential range (from pH 9 to 7) | Zeta potential trend with decreasing pH | Isoelectric point (pH) |
|---|---|---|---|---|
| Untreated control | −37.8 | −33 to −27 | Steady positive increase | ca. 2.5 |
| 1 | −41.8 | −39.7 to −38.4 | Essentially constant | None |
| 2 | −27.2 | −26 to −25 | Constant above pH 3 | ca. 1.7 |
| 3 | −29.1 | −28 to −28 | Constant above pH 3; positive increase below pH 3 | 1.37 |

Examples 6–9

Surface treatment of a perylene pigment

Crude perylene presscake for use in Examples 6–8 was prepared as described in Example 8 in U.S. Pat. No. 3,976,649.

A control perylene pigment was prepared using the same method as Example 6 except for omitting the phosphate ester.

Example 6

A 74.6 g portion of the crude perylene presscake (dry content of 30 g) was mixed with 500 ml of water until a smooth slurry was obtained. To this mixture was added 1.6 g of the phosphate ester of a dinonylphenol ethoxylate available as ETHOX® 2195 from Ethox Chemical (5% of the dry content of the pigment). The mixture was heated with stirring at 70° C. for one hour. The mixture was then filtered and the solid that was collected was washed with water until conductivity free and dried in an oven at 60° C.

Example 7

A 111.8 g portion of the same crude perylene presscake as used in Example 6 (dry content of 45 g) was mixed with 500 ml of water until a smooth slurry was obtained. The volume was adjusted to 1000 ml with additional water and the pH was adjusted to 9.0–9.5 with 50% aqueous sodium hydroxide. After the mixture was heated to 60° C., 5.0 g of the phosphate ester of a nonylphenol ethoxylate available as RHODAFAC® PE-510 from Rhone-Poulenc (11% of the dry content of the pigment) was added and the resultant mixture was stirred at 60° C. for thirty minutes. After the pH was adjusted to 2.5–3.0 with glacial acetic acid, the mixture was heated to 90° C. and stirred for one hour. The mixture was then filtered and the solid that was collected was washed with water until conductivity free and dried in an oven at 60° C. Zeta potential data for the resultant surface-treated pigment are shown in Table 2.

Example 8

The procedure of Example 7 was repeated except for using 5.0 g of the phosphate ester of a nonylphenol ethoxylate available as RHODAFAC® RE-610 from Rhone-Poulenc (11% of the dry content of the pigment). Zeta potential data for the resultant surface-treated pigment are shown in Table 2.

Example 9

A 228.6 g portion of the same crude perylene presscake as used in Example 6 (dry content of 92 g) was mixed with 1000 ml of water until a smooth slurry was obtained. To this mixture was added 5 g of the phosphate ester of a dinonylphenol ethoxylate available as ETHOX® 2195 from Ethox Chemical (5% of the dry content of the pigment) and 3 g of a sodium succinate sulfonate-containing surfactant available as AEROSOL® TR-70 from Cytec (3% of the dry content of pigment). The resultant mixture was stirred at 70° C for two hours. The mixture was then filtered and the solid that was collected was washed with water until conductivity free and dried in an oven at 60° C. Zeta potential data for the resultant surface-treated pigment are shown in Table 2.

TABLE 2

Zeta potential data for surface-treated perylenes

| Example | Initial zeta potential (pH 10) | Zeta potential range (from pH 9 to 7) | Zeta potential trend with decreasing pH | Isoelectric point (pH) |
|---|---|---|---|---|
| Untreated control | −22.1 | −21 to −19 | Steady positive increase | 1.88 |
| 7 | −41.3 | −41 to −41 | Constant | None |
| 8 | −31.8 | −31 to −32 | Essentially constant | ca. 1.8 |
| 9 | −55.4 | −54 to −52 | Essentially constant | None |

Examples 10–11

Surface treatment of a quinacridone pigment

Crude quinacridone presscake for use in Examples 9–10 was prepared using the general method of Example 1 of U.S. Pat. No. 3,342,823. See also U.S. Pat. Nos. 3,257,405, 3,940,349, and 4,100,162.

Example 10

A 207.4 g portion of the crude quinacridone presscake (dry content of 45 g) was mixed with 500 ml of water until a smooth slurry was obtained. The volume was adjusted to 800 ml with additional water, after which the pH was adjusted to 9.0-9.5 with 50% aqueous sodium hydroxide and 5.0 g of the phosphate ester of a dinonylphenol ethoxylate available as ETHOX® 2195 from Ethox Chemical(11% of the dry content of the pigment) was added. The resultant mixture was stirred at 55°-60° C. for thirty minutes. After the pH was adjusted to 2.5-3.0 with glacial acetic acid, the mixture was stirred for an additional hour. The mixture was then filtered, washed with water until conductivity free, and dried in an oven at 60° C.

Example 11

An 81.3 g portion of the crude quinacridone presscake (dry content of 45.0 g) was mixed in an autoclave with 197.4 ml of water until a smooth slurry was obtained. After the pH was adjusted to 9.0-9.5 with 50% aqueous sodium hydroxide, 2.4 g of the phosphate ester of a dinonylphenol ethoxylate available as ETHOX® 2195 from Ethox Chemical (ca. 9% of the dry content of the pigment) and 0.3 g of an acetylenic diol-based defoaming agent available as SUR-FYNOL® 104E from Air Products Inc. were added. After the pH was readjusted to 9.0-9.5 with sodium hydroxide, the volume was adjusted to 400 ml with water and the mixture was heated in the sealed autoclave at 130°-135° C. for three hours. The mixture was cooled below 70° C., adjusted to pH 4.0-4.5 with glacial acetic acid, and stirred for one hour at 60°-70° C. The mixture was then filtered, washed with water until conductivity free, and dried in an oven at 60° C.

What is claimed is:

1. A process for surface treating organic pigments comprising applying to the surface of an organic pigment
    (a) 0.5 to 15 percent by weight, relative to the pigment, of a phosphoric acid monoester having the formula

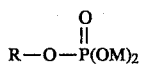

wherein
    R is
    (i) a saturated $C_5-C_{40}$ aliphatic group or a saturated $C_5-C_{40}$ aliphatic group in which one or more aliphatic carbon atoms is substituted with halogen, $C_1-C_6$ alkyl, $C_1-C_6$ alkoxy, a $C_6-C_{10}$ aromatic hydrocarbon group or a $C_6-C_{10}$ aromatic hydrocarbon group substituted with a $C_1-C_{12}$ alkyl group, or —$COOR^a$ (wherein $R^a$ is hydrogen, metal, ammonium, $C_1-C_6$ alkyl, or $C_6-C_{10}$ aryl), optionally wherein one or more non-adjacent aliphatic backbone carbon atoms are replaced with O, S, or $NR^b$ (wherein $R^b$ is $C_1-C_6$ alkyl or $C_6-C_{10}$ aryl), or
    (ii) an unsaturated $C_5-C_{40}$ aliphatic group or an unsaturated $C_5-C_{40}$ aliphatic group in which one or more aliphatic carbon atoms is substituted with halogen, $C_1-C_6$ alkyl, $C_1-C_6$ alkoxy, a $C_6-C_{10}$ aromatic hydrocarbon group or a $C_6-C_{10}$ aromatic hydrocarbon group substituted with one or more $C_1-C_6$ alkyl groups, or —$COOR^a$ (wherein $R^a$ is hydrogen, metal, ammonium, $C_1-C_6$ alkyl, or $C_6-C_{10}$ aryl), optionally wherein one or more non-adjacent aliphatic backbone carbon atoms are replaced with O, S, or $NR^b$ (wherein $R^b$ is $C_1-C_6$ alkyl or $C_6-C_{10}$ aryl), and
    M is hydrogen, metal, or ammonium;
in admixture with
    (b) 0 to 10 percent by weight, relative to the phosphoric acid monoester, of a process additive.

2. A process according to claim 1 for surface treating a phthalocyanine, perylene, or quinacridone pigment.

3. A process according to claim 1 wherein 3 to 10 percent by weight, relative to the pigment, of the phosphoric acid monoester is used.

4. A process according to claim 1 wherein R is a saturated $C_5-C_{40}$ aliphatic group in which one or more aliphatic carbon atoms is substituted with a $C_6-C_{10}$ aromatic hydrocarbon group or with a $C_6-C_{10}$ aromatic hydrocarbon group substituted with a $C_1-C_{12}$ alkyl group and in which one or more non-adjacent aliphatic backbone carbon atoms are replaced with O.

5. A process according to claim 1 wherein R is a polyalkylene oxide having 2 to 12 alkylene oxide units terminally substituted with a phenyl group having one or two $C_1-C_{12}$ alkyl substituents.

6. A process according to claim 1 wherein R is a saturated $C_5-C_{40}$ aliphatic group in which one or more aliphatic carbon atoms is substituted with —$COOR^a$ wherein $R^a$ is hydrogen, metal, ammonium, $C_1-C_6$ alkyl, or $C_6-C_{10}$ aryl.

7. A process according to claim 1 wherein M is hydrogen, an alkali or alkaline earth metal, $NH_4^+$, or tetra($C_1-C_6$ alkyl)ammonium.

8. A process according to claim 1 wherein the process additive is a defoamer and/or a surfactant.

9. A process according to claim 1 wherein 1 to 5 percent by weight), relative to the phosphoric acid monoester, of the process additive is used.

* * * * *